United States Patent [19]

Youn

[11] Patent Number: 5,573,581
[45] Date of Patent: Nov. 12, 1996

[54] COATING COMPOSITION FOR TREATING COLOR SENSITIVITY OF A COLOR PICTURE TUBE

[75] Inventor: Cheeyoul Youn, Pusan, Rep. of Korea

[73] Assignee: Samsung Display Devices Co., Ltd., Kyunggi-do, Rep. of Korea

[21] Appl. No.: 575,997

[22] Filed: Dec. 21, 1995

[30] Foreign Application Priority Data

Oct. 10, 1995 [KR] Rep. of Korea ............... 95-34705

[51] Int. Cl.$^6$ ............... C09D 183/02; C09D 5/24
[52] U.S. Cl. ............... 106/287.16
[58] Field of Search ............... 106/287.16

[56] References Cited

U.S. PATENT DOCUMENTS 5,281,365  1/1994  Sohn et al. ............... 106/286.4

OTHER PUBLICATIONS

CA 83:18842 "Electrochemiluminescent device having a mixed solvent", Pighin et al.

Primary Examiner—David Brunsman
Attorney, Agent, or Firm—Christie, Parker & Hale, LLP

[57] ABSTRACT

The present invention relates to a coating composition for treating colour sensitivity of a colour picture tube, in particular a composition comprising a silicate, a dye, a conductive material, and dimethylfluoroamide and methyl cellosolve as organic solvents.

4 Claims, No Drawings

COATING COMPOSITION FOR TREATING COLOR SENSITIVITY OF A COLOR PICTURE TUBE

BACKGROUND OF THE INVENTION

1. Field of the Invention

The present invention relates to a coating composition for treating colour sensitivity of a colour picture tube, and in particular a composition comprising a silicate, a dye or a conductive material, and dimethylfluoroamide and methyl cellosolve as organic solvents. By dissolving in dimethylfluoroamide and methyl cellosolve, the coating composition according to the present invention can not only delay gelation time of the composition, thereby improving storage, handling and spread properties of the composition, but also forms a coated film having a very uniform thickness and high strength.

2. Description of the Related Arts

A colour picture tube has advantages in that the tube is not limited in colour which exhibits an image, can be easily produced with low cost, and has high resolution. Accordingly, it is a very important display device to be widely used for televisions, monitors for computers, X-rays, measuring machines and the like. The colour picture tube consists of a panel having a fluorescent film of red, blue and green on the inner surface thereof and a bulb provided therein with an electron gun. The colour picture tube can exhibit an image by luminating a fluorescent material as an electron beam emitted from the electron gun is radiated to the fluorescent film of the panel. Accordingly, the colour picture tube is a so-called active type display which can exhibit an image by self-lumination, and an image thereof is very bright. The bright image is not critical in a television, however, there are undesirable effects when an operator continuously watches a screen, such as a monitor for a computer, from a short distance for a long time. Furthermore, fluorescent material which is luminated when exposed to an electronic ray, when the colour picture tube is in operation, cause a great deal of static electricity to be generated on the display and dust particles in the air easily adhere to the display due to the static electricity. In order to solve this disadvantage, various compositions for improving colour sensitivity and preventing electrification of the colour picture tube have been developed and the outer surface of a panel exhibiting an image has been coated with the composition. At the present time, a composition which is prepared by dissolving a silicate, a dye, a conductive material and the like in a mixed solvent comprising methanol and isopropyl alcohol has been generally used as a coating material for treating colour sensitivity of a picture tube. However, the composition has poor flow property and stains in a comb pattern on the surface of the picture tube after coating. Further, formation of occurs too early and it is difficult to preserve the composition. Also, the film is frequently scratched because the film strength is low.

SUMMARY OF THE INVENTION

In order to solve the problems as described above, an object of this invention is to provide a coating composition which can be preserved for a long time, easily handled, and has good flow property to obtain a uniform surface of a coated film and high strength thereof.

An embodiment of the present invention provides a coating composition for improving colour sensitivity and preventing electrification of a colour picture tube, and comprises a solution which is prepared by dissolving ethylsilicate, antimony chloride, tin chloride and a dye in a solvent containing methanol, isopropyl alcohol and n-butanol, and further adding 0.6% to 12% by weight of methyl cellosolve and 0.1% to 6% by weight of dimethylfluoroamide based on the total weight of the composition.

Addition of methyl cellosolve and dimethylfluoroamide is carried out as follows:

Dimethylfluoroamide is first added to the solution, and the resulting mixture is allowed to stand for about 10 hours to obtain an equilibrium state, thereafter, methyl cellosolve is added thereto and allowed to stand for about 10 hours thereby obtaining uniform dispersion.

Conversely, methyl cellosolve can be first added to the solution, and the resulting mixture is allowed to stand for 10 hours to obtain an equilibrium state, thereafter, dimethylfluoroamide is added thereto and allowed to stand for 10 hours thereby obtaining a uniform dispersion.

Still further, methyl cellosolve and dimethylfluoroamide can be simultaneously added to the solution and the resulting mixture is allowed to stand for 10 hours thereby obtaining a uniform dispersion.

The reason why the resulting mixture is allowed to stand is that if the mixture is not allowed to stand, methyl cellosolve is not uniformly dispersed into the solution, adherence to a coated film is decreased, and the film strength is decreased.

The composition according to this invention can be uniformly coated on substrates such as glass or ceramic by a conventional roll coating method. The coated film has good adherence to the substrates, such as glass or ceramic, and is quickly dried at a low temperature below 200° C. and easily baked at a low temperature below 500° C. Furthermore, because the coated film obtained by baking has high surface strength of the film, the film has high resistance to friction.

DETAILED DESCRIPTION OF THE EMBODIMENTS

The present invention is further explained in more detail with reference to the following examples which do not limit this invention.

EXAMPLE 1

10 parts by weight of ethylsilicate, 2.5 parts by weight of antimony chloride, 2.5 parts by weight of tin chloride and 0.1 parts by weight of a black pigment were added to 70 parts by weight of a solvent consisting of 1:1:1 ratio of methanol, isopropyl alcohol and n-butanol, and 1% by weight of methyl cellosolve based on the total weight of the composition was added to the resulting mixture. Thereafter, the resultant was shaken for 12 hours to obtain equilibrium state and then 0.1% by weight of dimethylfluoroamide based on the total weight of the composition was added thereto, thereby preparing a coating composition. The coating composition was coated on a glass substrate using a roll coating printing method and dried at an atmosphere of 150° to 180° C. to vaporize the solvent to obtain uniformly coated films. Thereafter, the coated films were baked at a temperature of 500° C. for 3 hours to obtain a final product.

EXAMPLE 2

Example 1 was repeated except that the order of adding methyl cellosolve and dimethylfluoroamide was changed.

EXAMPLE 3

Example 2 was repeated except that methyl cellosolve was added to the mixture before rather than after the shaking.

COMPARATIVE EXAMPLE 1

Example 1 was repeated except that dimethylfluoroamide and methyl cellosolve were not used and the shaking step was omitted.

COMPARATIVE EXAMPLE 2

Example 2 was repeated except that the shaking step was omitted.

Flow property, time taken for initial gelation, and the coated film strength obtained in Examples 1 to 3 and Comparative examples 1 to 2, respectively, were measured and the results are shown in following Table.

TABLE

|  | Flow property of coating composition (Occurrence of stains) | Time taken for initial gelation | Film strength (Amount of frictions, at which the film starts to be peeled off) |
| --- | --- | --- | --- |
| Example 1 | No | 48 hours | 100 times |
| Example 2 | No | 48 hours | 100 times |
| Example 3 | No | 48 hours | 120 times |
| Comparative example 1 | Yes | 18 hours | 40 times |
| comparative example 2 | No | 48 hours | 120 times |

EXAMPLE 4

Example 3 was repeated except that 6% by weight of dimethylfluoroamide and 1% by weight of methyl cellosolve were used in place of 0.1% by weight of dimethylfluoroamide and 1% by weight of methyl cellosolve.

EXAMPLE 5

Example 4 was repeated except that 1% by weight of methyl cellosolve was used in place of 6% by weight of methyl cellosolve.

EXAMPLE 6

Example 4 was repeated except that 0.5% by weight of dimethylfluoroamide and 0.5% by weight of methyl cellosolve were used rather than 6% by weight of dimethylfluoroamide and 1% by weight of methyl cellosolve.

The coating compositions obtained in Examples 4 to 6 had good spread properties so that comb stain pattern and core stain did not occur after coating. The amount of friction, at which the film started to peel, was 80 to 100 times, and thus the film had higher strength than conventional film. Furthermore, when the coated film was scratched with fingernails, the film did not peel off from the coated surface. This showed that the film had good mechanical characteristics. Furthermore, one of the required characteristics of the coating composition, the colour coordinate had a good showing L was 29, a was 2.1 to 2.4, and b was about −2.5.

In conclusion, the composition according to this invention had good flow property and the time taken for initial gelation was long, which enabled the composition to be stored for a long time, easily handled, and had a high surface strength of film, when compared with a conventional composition.

What is claimed is:

1. A composition for improving colour sensitivity and preventing electrification of a colour picture tube, comprising:

a solution prepared by dissolving ethylsilicate, antimony chloride, tin chloride and a pigment in a solvent consisting of isopropyl alcohol and n-butanol;

0.6% to 12% by weight of methyl cellosolve based on the total weight of the composition; and 0.1% to 6% by weight of dimethylfluoroamide based on the total weight of the composition.

2. The composition according to claim 1 wherein said dimethylfluoroamide is added to the solution and the resulting mixture is allowed to stand for about 10 hours to obtain an equilibrium state, thereafter, said methyl cellosolve is added thereto and allowed to stand for about 10 hours thereby obtaining a uniform dispersion.

3. The composition according to claim 1 wherein said methyl cellosolve is added to the solution, and the resulting mixture is allowed to stand for 10 hours to obtain an equilibrium state, thereafter, said dimethylfluoroamide is added thereto and allowed to stand for 10 hours thereby obtaining a uniform dispersion.

4. The composition according to claim 1 wherein said methyl cellosolve and dimethylfluoroamide are simultaneously added to the solution and allowed to stand for 10 hours to thereby obtaining a equilibrium state.

* * * * *